US012565564B2

(12) United States Patent
Ro et al.

(10) Patent No.: US 12,565,564 B2
(45) Date of Patent: Mar. 3, 2026

(54) POLYIMIDE AND MANUFACTURING METHOD THEREFOR

(71) Applicant: PI ADVANCED MATERIALS CO., LTD., Chungcheongbuk-do (KR)

(72) Inventors: Gyeong Hyeon Ro, Gyeongsangnam-do (KR); In Hwan Hwang, Seoul (KR); Ik Sang Lee, Gyeongsangbuk-do (KR)

(73) Assignee: PI ADVANCED MATERIALS CO., LTD., Chungcheongbuk-do (KR)

( * ) Notice: Subject to any disclaimer, the term of this patent is extended or adjusted under 35 U.S.C. 154(b) by 737 days.

(21) Appl. No.: 17/610,999

(22) PCT Filed: Nov. 28, 2019

(86) PCT No.: PCT/KR2019/016607
§ 371 (c)(1),
(2) Date: Nov. 12, 2021

(87) PCT Pub. No.: WO2020/230969
PCT Pub. Date: Nov. 19, 2020

(65) Prior Publication Data
US 2022/0227941 A1      Jul. 21, 2022

(30) Foreign Application Priority Data

May 13, 2019      (KR) ........................ 10-2019-0055736

(51) Int. Cl.
*C08G 73/10*      (2006.01)
*C08J 5/18*      (2006.01)
*C08L 79/08*      (2006.01)

(52) U.S. Cl.
CPC ..... *C08G 73/1067* (2013.01); *C08G 73/1007* (2013.01); *C08L 79/08* (2013.01); *C08L 2201/08* (2013.01); *C08L 2201/10* (2013.01); *C08L 2203/16* (2013.01)

(58) Field of Classification Search
None
See application file for complete search history.

(56) References Cited

U.S. PATENT DOCUMENTS

| | | | | | |
|---|---|---|---|---|---|
| 5,753,372 | A | * | 5/1998 | Sotokawa | ......... H01L 21/02118 |
| | | | | | 257/E21.582 |
| 2014/0066571 | A1 | * | 3/2014 | Takasawa | ............ B05D 3/0254 |
| | | | | | 524/879 |

FOREIGN PATENT DOCUMENTS

| | | | | |
|---|---|---|---|---|
| CN | 104558603 | A | 4/2015 | |
| CN | 109311297 | A | 2/2019 | |
| JP | 2010536981 | A | 12/2010 | |
| KR | 1020120069382 | A | 6/2012 | |
| KR | 1020160077694 | A | 7/2016 | |
| KR | 1020170076096 | A | 7/2017 | |
| KR | 101780447 | B1 | 9/2017 | |
| KR | 1020190003328 | A | 1/2019 | |
| WO | WO-2015046128 | A1 * | 4/2015 | .......... B05D 3/0209 |
| WO | WO-2019004677 | A1 * | 1/2019 | ............. C08G 73/10 |

OTHER PUBLICATIONS

Smith et al., "Optical and Thermo-optical Properties of Polyimide Single-Walled Carbon Nanotube Films: Experimental Results and Empirical Equations," https://ntrs.nasa.gov/api/citations/20090014202/downloads/20090014202.pdf , accessed 2024. (Year: 2024).*
JP 2021-568068, First Office Action, dated Feb. 13, 2023, cited reference has already been submitted.
CN 2019800984374, First Office Action, dated Apr. 26, 2023, cited references being submitted.

* cited by examiner

*Primary Examiner* — Ha S Nguyen
(74) *Attorney, Agent, or Firm* — Dority & Manning, P.A.

(57) ABSTRACT

The present application relates to a polyimide and a manufacturing method therefor, thereby providing a polyimide capable of implementing excellent adhesion force while maintaining the inherent characteristics of the polyimide, and a manufacturing method therefor.

12 Claims, No Drawings

POLYIMIDE AND MANUFACTURING METHOD THEREFOR

CROSS-CITATION WITH RELATED APPLICATIONS

This application claims the benefit of priority based on Korean Patent Application No. 10-2019-0055736 dated May 13, 2019, the disclosure of which is incorporated herein by reference in its entirety.

TECHNICAL FIELD

The present application relates to a polyimide and a manufacturing method therefor.

BACKGROUND ART

A polyimide (PI) is a polymer material with thermal stability based on a rigid aromatic main chain, which has excellent mechanical properties such as strength, chemical resistance, weather resistance and heat resistance, based on chemical stability of imide rings.

In addition, the polyimide has insulation properties and excellent electrical properties such as a low permittivity, thereby being in the spotlight as a high-functional polymer material applicable to a wide range of industrial fields such as electronics, communications and optics.

However, in general, the polyimide resin is difficult to be regarded as having high adhesion force among polymer resins, and various studies have been conducted to further improve adhesion force.

For example, in order to improve the adhesion force of the polyimide resin, a method of limiting the content of the monomer has been attempted in some cases, but the adhesion force is slightly improved, whereas mechanical properties such as an elongation and a tensile strength may be lowered, and dimensional stability may be sacrificed.

Therefore, there is a need for a novel polyimide resin capable of securing an appropriate level of glass transition temperature and dimensional stability while having better adhesion force than the conventional one.

DISCLOSURE

Technical Problem

The present application is to provide a polyimide capable of implementing excellent adhesion force while maintaining the inherent properties of the polyimide by solving the conventional problems recognized above, and a manufacturing method therefor.

Technical Solution

The present application relates to a polyimide. The polyimide of the present application is applicable in fields requiring adhesion force by using varnishes such as displays, enamels, semiconductors and binders, or requiring dimensional stability.

An exemplary polyimide comprises a polymer in which a diamine monomer and a dianhydride monomer are polymerized, which may have average light transmittance in a wavelength region of 380 nm to 780 nm in a range of 49 to 61%, and light transmittance at a wavelength of 550 nm in a range of 40 to 64%. In this specification, the light transmittance may be measured using a UV-Vis spectrometer. In one example, the lower limit of the average light transmittance in the wavelength region of 380 nm to 780 nm may be 49.5%, 50%, 51%, 53%, 54%, 55%, 56%, or 56.5%, and the upper limit thereof may be 60.8%. %, 60.5%, 60.3%, 60%, 58%, 55%, 53%, or 50%. Also, in one embodiment, the lower limit of the light transmittance at the wavelength of 550 nm may be 45%, 50%, 53%, 54.1%, 54.5%, 55%, 56% or 58%, and the upper limit thereof may be 63.8%, 63.5%, 63.3%, 63%, 61%, 58%, 56%, 55%, 54% or 52%. In the present application, by adjusting the light transmittance of the polyimide as described above, an adhesion force promoter may be formed in the polyimide molecular structure, and accordingly, the adhesion force of the polyimide, which has conventionally low adhesion force, may be implemented at a desired level. The method of adjusting the light transmittance is not particularly limited.

In one example, the polyimide of the present application may be derived from a polyamic acid in which a diamine monomer and a dianhydride monomer are polymerized. In one example, the matter of being derived from a polyamic acid may mean that the polyamic acid is imidized to form a polyimide of the present application.

The polyamic acid, which is a polyimide precursor composition, may form long polymer chains when imidized. However, short chains may be generated during this process. Since the short chains act as impurities in the composition, the adhesion force may be lowered. The present application may increase adhesion force by oxidizing the short chains. In the present application, as the light transmittance of the polyimide film is lowered, some chains may be oxidized. Accordingly, by adjusting the light transmittance in the wavelength region of 380 nm to 780 nm and at the wavelength of 550 nm to the above ranges, the present invention may oxidize some chains in the polyimide molecular structure, thereby improving adhesion force.

In an embodiment of the present application, the polymer of the present application comprises first chains and second chains that are shorter chains than the first chains, where the second chains may be in an oxidized state. If the first chain is the above-described long polymer chain, the second chain may be the short chain. In this specification, the long chain and the short chain have relative concepts, which do not limit absolute values. It can be known, on the contrary, through the above-described light transmittance ranges in the wavelength region of 380 nm to 780 nm and at the wavelength of 550 nm whether or not the second chain are oxidized. In one example, the second chains may be included in a range of 5 wt % or less in the total polymer. The upper limit of the content of the second chains may be 4.8 wt %, 4.5 wt %, 4.3 wt %, 4.0 wt %, 3.8 wt %, 3.5 wt %, 3.3 wt %, 3.0 wt %, 2.8 wt %, 2.5 wt %, 2.3 wt %, 2.0 wt %, 1.5 wt %, 1.0 wt % or 0.8 wt %. In addition, the lower limit of the content of the second chains may be 0 wt %, 0.3 wt %, 0.5 wt %, 0.7 wt %, 1.0 wt %, or 1.3 wt %. The present application can provide a polyimide having excellent adhesion force while maintaining mechanical properties such as the inherent polyimide strength, chemical resistance, weather resistance and heat resistance through the oxidized second chains.

The dianhydride monomer that can be used in the preparation of the polyamic acid solution may be an aromatic tetracarboxylic dianhydride, where the aromatic tetracarboxylic dianhydride may be exemplified by pyromellitic dianhydride (or PMDA), 3,3',4,4'-biphenyltetracarboxylic dianhydride (or BPDA), 2,3,3',4'-biphenyltetracarboxylic dianhydride (or a-BPDA), oxydiphthalic dianhydride (or ODPA), diphenylsulfone-3,4,3',4'-tetracarboxylic dianhydride (or DSDA), bis(3,4-dicarboxyphenyl)sulfide dianhy-dride, 2,2-bis(3,4-dicarboxyphenyl)-1,1,1,3,3,3-hexafluoro-propane dianhydride, 2,3,3',4'-benzophenonetetracarboxylic dianhydride, 3,3',4,4'-benzophenonetetracarboxylic dianhy-dride (or BTDA), bis(3,4-dicarboxyphenyl)methane dianhy-dride, 2,2-bis(3,4-dicarboxyphenyl)propane dianhydride, p-phenylenebis(trimellitic monoester acid anhydride), p-bi-phenylenebis(trimellitic monoester acid anhydride), m-ter-phenyl-3,4,3',4'-tetracarboxylic dianhydride, p-terphenyl-3,4,3',4'-tetracarboxylic dianhydride, 1,3-bis(3,4-dicarboxyphenoxy)benzene dianhydride, 1,4-bis(3,4-dicarboxyphenoxy)benzene dianhydride, 1,4-bis(3,4-dicarboxyphenoxy)biphenyl dianhydride, 2,2-bis[(3,4-dicarboxyphenoxy)phenyl]propane dianhydride (BPADA), 2,3,6,7-naphthalenetetracarboxylic acid dianhydride, 1,4,5,8-naphthalenetetracarboxylicdianhydride, 4,4'-(2,2-hexaflu-oroisopropylidene)diphthalic acid dianhydride, and the like.

The dianhydride monomer may be used alone or in combination of two or more as needed, but it may comprise, for example, pyromellitic dianhydride (PMDA), 3,3',4,4'-biphenyltetracarboxylic dianhydride (s-BPDA) or 2,3,3',4'-biphenyltetracarboxylic dianhydride (a-BPDA).

In addition, the diamine monomer that can be used for preparing the polyamic acid solution is an aromatic diamine, which may be classified and exemplified as follows.

1) diamines having a relatively rigid structure, as diamines having one benzene nucleus in structure, such as 1,4-diaminobenzene (or paraphenylenediamine, PDA), 1,3-diaminobenzene, 2,4-diaminotoluene, 2,6-diaminotoluene, 3,5-diaminobenzoic acid (or DABA), and the like;

2) diamines having two benzene nuclei in structure, such as diaminodiphenyl ethers of 4,4'-diaminodiphenyl ether (or oxydianiline, ODA), 3,4'-diaminodiphenyl ether, and the like, 4,4'-diaminodiphenylmethane (methylenediamine), 3,3'-dimethyl-4,4'-diaminobiphenyl, 2,2'-dimethyl-4,4'-di-aminobiphenyl, 2,2'-bis(trifluoromethyl)-4,4'-diaminobi-phenyl, 3,3'-dimethyl-4,4'-diaminodiphenylmethane, 3,3'-dicarboxy-4,4'-diaminodiphenylmethane, 3,3',5,5'-tetramethyl-4,4'-diaminodiphenylmethane, bis(4-aminophenyl)sulfide, 4,4'-diaminobenzanilide, 3,3'-dichlorobenzidine, 3,3'-dimethylbenzidine (or o-tolidine), 2,2'-dimethylbenzidine (or m-tolidine), 3,3'-dimethoxyben-zidine, 2,2'-dimethoxybenzidine, 3,3'-diaminodiphenyl ether, 3,4'-diaminodiphenyl ether, 4,4'-diaminodiphenyl ether, 3,3'-diaminodiphenylsulfide, 3,4'-diaminodiphe-nylsulfide, 4,4'-diaminodiphenylsulfide, 3,3'-diaminodiphe-nylsulfone, 3,4'-diaminodiphenylsulfone, 4,4'-diaminodi-phenylsulfone, 3,3'-diaminobenzophenone, 4,4'-diaminobenzophenone, 3,3'-diamino-4,4'-dichlorobenzophenone, 3,3'-diamino-4,4'-dimethoxybenzophenone, 3,3'-diaminodiphenylmethane, 3,4'-diaminodiphenylmethane, 4,4'-diaminodiphenylmeth-ane, 2,2-bis(3-aminophenyl)propane, 2,2-bis(4-aminophe-nyl)propane, 2,2-bis(3-aminophenyl)-1,1,1,3,3,3-hexafluo-ropropane, 2,2-bis(4-aminophenyl)-1,1,1,3,3,3-hexafluoropropane, 3,3'-diaminodiphenylsulfoxide, 3,4'-diaminodiphenylsulfoxide, 4,4'-diaminodiphenyl sulfoxide, and the like;

3) diamines having three benzene nuclei in structure, such as 1,3-bis(3-aminophenyl)benzene, 1,3-bis(4-aminophenyl) benzene, 1,4-bis(3-aminophenyl)benzene, 1,4-bis(4-amino) phenyl)benzene, 1,3-bis(4-aminophenoxy)benzene, 1,4-bis (3-aminophenoxy)benzene (or TPE-Q), 1,4-bis(4-aminophenoxy)benzene (or TPE-Q), 1,3-bis(3-aminophenoxy)-4-trifluoromethylbenzene, 3,3'-diamino-4-(4-phenyl)phenoxybenzophenone, 3,3'-diamino-4,4'-di(4-phenylphenoxy)benzophenone, 1,3-bis(3- aminophenylsulfide)benzene, 1,3-bis(4-aminophenylsul-fide)benzene, 1,4-bis(4-aminophenylsulfide)benzene, 1,3-bis(3-aminophenylsulfone)benzene, 1,3-bis(4-aminophe-nylsulfone)benzene, 1,4-bis(4-aminophenylsulfone) benzene, 1,3-bis[2-(4-aminophenyl)isopropyl]benzene, 1,4-bis[2-(3-aminophenyl)isopropyl]benzene, 1,4-bis[2-(4-aminophenyl)isopropyl]benzene, and the like;

4) diamines having four benzene nuclei in structure, such as 3,3'-bis(3-aminophenoxy)biphenyl, 3,3'-bis(4-aminophe-noxy)biphenyl, 4,4'-bis(3-aminophenoxy)biphenyl, 4,4'-bis (4-aminophenoxy)biphenyl, bis[3-(3-aminophenoxy)phe-nyl] ether, bis[3-(4-aminophenoxy)phenyl] ether, bis[4-(3-aminophenoxy)phenyl] ether, bis[4-(4-aminophenoxy) phenyl] ether, bis[3-(3-aminophenoxy)phenyl] ketone, bis [3-(4-aminophenoxy)phenyl] ketone, bis[4-(3-aminophenoxy)phenyl] ketone, bis[4-(4-aminophenoxy) phenyl] ketone, bis[3-(3-aminophenoxy)phenyl]sulfide, bis [3-(4-aminophenoxy)phenyl]sulfide, bis[4-(3-aminophenoxy)phenyl]sulfide, bis[4-(4-aminophenoxy) phenyl]sulfide, bis[3-(3-aminophenoxy)phenyl]sulfone, bis [3-(4-aminophenoxy)phenyl]sulfone, bis[4-(3-aminophenoxy)phenyl]sulfone, bis[4-(4-aminophenoxy) phenyl]sulfone, bis[3-(3-aminophenoxy)phenyl]methane, bis[3-(4-aminophenoxy)phenyl]methane, bis[4-(3-amino-phenoxy)phenyl]methane, bis[4-(4-aminophenoxy)phenyl] methane, 2,2-bis[3-(3-aminophenoxy)phenyl]propane, 2,2-bis[3-(4-aminophenoxy)phenyl]propane, 2,2-bis[4-(3-aminophenoxy)phenyl]propane, 2,2-bis[4-(4-aminophenoxy)phenyl]propane (BAPP), 2,2-bis[3-(3-aminophenoxy)phenyl]-1,1,1,3,3,3-hexafluoropropane, 2,2-bis[3-(4-aminophenoxy)phenyl]-1,1,1,3,3,3-hexafluoropropane, 2,2-bis[4-(3-aminophenoxy)phenyl]-1,1,1,3,3,3-hexafluoropropane, 2,2-bis[4-(4-aminophenoxy) phenyl]-1,1,1,3,3,3-hexafluoropropane, and the like.

The diamine monomer may be used alone or in combi-nation of two or more as needed, which may include, for example, 3,5-diaminobenzoic acid, 3,3-dihydroxy-4,4-di-amino-biphenyl, 2,5-dihydroxy-p-phenylenediamine, 4,6-diaminoresorcinol, 1,4-diaminobenzene (PPD), 1,3-di-aminobenzene (MPD), 2,4-diaminotoluene, 2,6-diaminotoluene or 4,4'-methylenediamine (MDA).

In an embodiment of the present application, the diamine monomer may comprise at least one or more hydroxyl groups in the molecular structure. As described above, the present application may adjust substituents in the molecular structure of the polyimide, and in one example, as the diamine monomer comprises one or more hydroxyl groups, it may implement excellent adhesion force while maintain-ing the existing physical properties of the polyimide. In addition, the dianhydride monomer may comprise at least one or more hydroxyl groups in the molecular structure.

In one example, the polyimide may have a thermal decomposition temperature of 560° C. or more, or 562° C. or more. The upper limit is not particularly limited, but may be 1000° C. or less, or 800° C. or less. In the polyimide of the present application, unreacted monomers can be mini-mized by adjusting the thermal decomposition temperature, whereby it is possible to provide a polyimide having desired physical properties.

In one embodiment, the polyimide of the present appli-cation may have a weight average molecular weight in a range of 500 to 100,000, 1,000 to 80,000, 10,000 to 70,000, 20,000 to 60,000, 25,000 to 55,000, or 30,000 to 50,000. In the present application, the term weight average molecular weight means a value converted to standard polystyrene measured by GPC (gel permeation chromatograph). By adjusting the weight average molecular weight of the polyimide of the present application, it is possible to provide a polyimide having desired physical properties.

Furthermore, in one example, the polyimide may have a glass transition temperature of 360° C. or more, 370° C. or more, 375° C. or more, 380° C. or more, or 400° C. or more. The upper limit is not particularly limited, but may be 600° C. or 550° C. In addition, the polyimide may have a coefficient of thermal expansion (CTE) of 15 ppm/° C. or less, 13 ppm/° C. or less, 10 ppm/° C. or less, or 5 ppm/° C. or less. The lower limit is not particularly limited, but may be 0 ppm/° C. or 2 ppm/° C. The CTE may be, for example, measured when the temperature is raised or lowered from 100° C. to 350° C. By adjusting the physical properties of the polyimide, the present application can implement excellent adhesion force while maintaining mechanical properties such as the existing excellent strength, chemical resistance, weather resistance and heat resistance of the polyimide.

In one example, the polyimide of the present application may be a polyimide imidized under a nitrogen and oxygen atmosphere. In one example, the polyimide may be a polyimide that a polyamic acid is imidized under an oxygen and nitrogen atmosphere. By imidizing the polyamic acid under an oxygen and nitrogen atmosphere as described above, the present application can induce an oxidation reaction due to oxygen, and improve the adhesion force of the entire polyimide through chains having a relatively low molecular weight.

In the present application, the polyimide precursor composition may be used in the same meaning as the polyamic acid. The organic solvent is not particularly limited as long as it is an organic solvent in which the polyamic acid can be dissolved, but may be an aprotic polar solvent as one example.

The aprotic polar solvent may include, for example, amide-based solvents such as N,N'-dimethylformamide (DMF) and N,N'-dimethylacetamide (DMAc), phenolic solvents such as p-chlorophenol and o-chlorophenol, N-methyl-pyrrolidone (NMP), gamma butyrolactone (GBL) and diglyme, and the like, and these may be used alone or in combination of two or more.

In the present application, the solubility of the polyamic acid may also be adjusted in some cases by using an auxiliary solvent such as toluene, tetrahydrofuran, acetone, methyl ethyl ketone, methanol, ethanol and water.

In one example, the organic solvent may be, for example, N-methyl-pyrrolidone (NMP).

Meanwhile, the polyimide precursor composition of the present application may comprise a filler for the purpose of improving various properties of the film, such as sliding properties, thermal conductivity, conductivity, corona resistance, loop stiffness. The filler to be added is not particularly limited, but may include, for example, silica, titanium oxide, alumina, silicon nitride, boron nitride, calcium hydrogen phosphate, calcium phosphate, mica, and the like.

The particle diameter of the filler is not particularly limited, which may be determined according to the characteristics of the film to be modified and the type of the filler to be added. The average particle diameter may be 0.05 to 20 μm, 0.1 to 10 μm, 0.1 to 5 μm, or 0.1 to 3 μm. In this specification, the average particle diameter may be an average particle diameter measured according to D50 particle size analyses, unless otherwise specified.

By adjusting the particle diameter range, the present application may not lower the mechanical properties, without damaging the surface properties while sufficiently maintaining the modifying effect.

Also, in the present application, the additive amount of the filler is not particularly limited, which may be determined by the film characteristics to be modified or the particle diameter of the filler, and the like. In the present application, the additive amount of the filler may be 0.01 to 10 parts by weight, 0.01 to 5 parts by weight, or 0.02 to 1 part by weight relative to 100 parts by weight of the polyimide resin. By adjusting the content, the present application may not impair the mechanical properties of the film while sufficiently maintaining the modifying effect of the filler.

The method of adding the filler is not particularly limited, and a method known in similar industries may also be used.

In one specific example, the polyimide precursor composition may comprise 5 to 30 wt %, 8 to 25 wt % or 10 to 20 wt % of solid contents based on the total weight.

By adjusting the solid contents of the polyimide precursor composition, the present application can prevent manufacturing cost and process time increases required to remove a large amount of solvent in a curing process while controlling the viscosity increase.

The polyimide precursor composition may have a viscosity of 10,000 cP or less, or 9,000 cP or less as measured by a Brookfield viscometer in the RV-7 spindle under conditions of a temperature of 23° C. and a rotation speed of 0.5 rpm. The lower limit is not particularly limited, but may be 500 cP or more, or 1000 cP or more.

Meanwhile, the preparation of the polyamic acid solution uses, for example, a method in which the whole amount of the diamine monomer is put in a solvent, and then the dianhydride monomer is added thereto so as to be substantially equimolar to or in excess of the diamine monomer to be polymerized or a method in which the whole amount of the dianhydride monomer is put in a solvent, and then the diamine monomer is added thereto so as to be substantially equimolar to or in excess of the dianhydride monomer to be polymerized, and the like.

In an embodiment of the present application, the polyimide may have adhesion force of 0.08 N/cm or more as measured according to ASTM D 3359. The adhesion force may be, for example, 0.12 N/cm or more, 0.15 N/cm or more, 0.18 N/cm or more, 0.22 N/cm or more, 0.25 N/cm or more, 0.3 N/cm or more, 0.33 N/cm or more, 0.38 N/cm or more, or 0.45 N/cm or more, and the upper limit thereof is not particularly limited, but may be 5 N/cm, 4 N/cm, 3 N/cm, 2 N/cm, 1 N/cm, 0.8 N/cm, or 0.6 N/cm. The adhesion force may be adhesion force measured while attaching the prepared polyimide film to a glass substrate to have a width of 10 mm and peeling it at a peel rate of 20 mm/min and a peel angle of 180°.

The present application also relates to a method for manufacturing a polyimide. The manufacturing method may be the above-described manufacturing method of the polyimide.

The manufacturing method may comprise a step of imidizing a polyimide precursor composition under a nitrogen and oxygen atmosphere. In the imidizing step of the present application, it is possible to introduce not only nitrogen but also a certain amount of oxygen together. The present application may induce an oxidation reaction due to oxygen, and improve the adhesion force of the entire polyimide through chains having a relatively low molecular weight.

In the above step of the present application, nitrogen and oxygen may have volume ratios of 95 to 5 and 5 to 95, respectively. In the volume ratios, for example, the nitrogen volume ratio may be 94 to 8, 93 to 20, 92 to 40, 91 to 60, or 90 to 82. In addition, the oxygen volume ratio may be adjusted within the range of, for example, 6 to 80, 7 to 60, 8 to 40, or 9 to 18. By adjusting the volume ratios of nitrogen and oxygen, the present application may oxidize short chains having a low molecular weight in a polyimide and adjust an adhesion promoter in the polyimide, thereby implementing excellent adhesion force. In addition, the present application may also maintain the existing physical properties of the polyimide within the above volume ratio ranges.

In one example, the manufacturing method may have a process temperature of 50 to 500° C., 100 to 480° C., or 130 to 470° C. In addition, the polyimide precursor composition may be prepared as a polyimide having a film form by being applied on a support or a base material, where the polyimide may have a film form with a thickness of 5 to 50 μm or 10 to 20 μm.

In one example, the present application may provide a method for manufacturing a polyimide film, comprising steps of: forming the polyimide precursor composition on a support into a film and drying it to prepare a gel film; and curing the gel film, in the manufacturing method of the polyimide.

Specifically, with respect to a method for manufacturing a polyimide film by imidizing the above-described polyimide precursor composition, a conventionally known method may be used.

A specific example of such imidization may be exemplified by a thermal imidization method, a chemical imidization method, or a complex imidization method using the thermal imidization method and the chemical imidization method in combination.

Advantageous Effects

The present application provides a polyimide capable of implementing excellent adhesion force while maintaining the inherent characteristics of the polyimide, and a manufacturing method therefor.

BEST MODE

Hereinafter, the present invention will be described in more detail through Examples according to the present invention and Comparative Examples not according to the present invention, but the scope of the present invention is not limited by Examples presented below.

Example 1

N-methyl-pyrrolidone (NMP) was introduced into a 500 ml reactor equipped with a stirrer and nitrogen injection and discharge tubes while nitrogen was injected thereto, and after the temperature of the reactor was set to 30° C., 1,4-diaminobenzene (PPD) as a diamine monomer, and biphenyltetracarboxylic dianhydride (BPDA) and pyromellitic dianhydride (PMDA) as dianhydride monomers were introduced to confirm that they were completely dissolved. The temperature was raised to 40° C. under a nitrogen atmosphere, and stirring was continued for 120 minutes while heating, and then a polyamic acid solution having a viscosity of 7,000 cP at 23° C. was prepared.

Subsequently, the temperature was raised to 80° C. under a nitrogen atmosphere, and stirring was additionally continued for 2 hours while heating, and then the temperature was cooled to 23° C. to prepare a polyimide precursor composition representing a viscosity of 5,100 cP.

The polyimide precursor composition was applied to a WIZUS Glass (Asahi Glass) support in the form of a thin film, and then heat-treated under an oxygen and nitrogen atmosphere of Table 1 below, while starting the temperature from about 110° C. and increasing it to 460° C., and subsequently peeled from the support to prepare a polyimide in the form of a film having an average thickness of about 15 to 17 μm, respectively.

Examples 2 to 5 and Comparative Examples 1 to 2

Polyimides were prepared in the same method as in Example 1, except that in Example 1, process conditions were each changed as shown in Table 1 below.

TABLE 1

| | | Atmosphere (Nitrogen:oxygen) (Volume ratio) | Film thickness (μm) | Process highest temperature (° C.) |
|---|---|---|---|---|
| Example | 1 | 90:10 | 15.3 | 460 |
| | 2 | 80:20 | 15.8 | 460 |
| | 3 | 50:50 | 15.4 | 460 |
| | 4 | 30:70 | 15.0 | 460 |
| | 5 | 10:90 | 16.2 | 460 |
| Comparative Example | 1 | 100:0 | 15.3 | 460 |
| | 2 | 0:100 | 15.3 | 460 |

Experimental Example 1—CTE

TA's Thermomechanical Analyzer Q400 model was used, and a polyimide film was cut into 2 mm wide and 10 mm long, and then after the temperature was raised from room temperature to 500° C. at a rate of 10° C./min while applying a tension of 0.05 N under a nitrogen atmosphere, the gradient of the section from 100° C. to 350° C. was measured while cooling at a rate of 10° C./min again. The CTE was first measured in the elevating temperature section from 100° C. to 350° C., and subsequently the CTE was measured in the reducing temperature section from 350° C. to 100° C.

Experimental Example 2—Glass Transition Temperature

As for the glass transition temperature, the loss elastic modulus and storage elastic modulus of each polyimide resin were obtained using TMA, and the inflection point in their tangent graphs was measured as the glass transition temperature.

Experimental Example 3—Adhesion Force

Adhesion force was measured using the method set forth in ASTM D 3359. Specifically, the polyimide films prepared in Examples and Comparative Examples were each attached to a glass substrate to have a width of 10 mm, and the adhesion force was measured while peeling it at a peel rate of 20 mm/min and a peel angle of 180°. The unit of adhesion force is N/cm.

Experimental Example 4—Light Transmittance

With respect to the polyimide film prepared above, using a UV-Vis spectrometer, the light transmittance was measured in a wavelength region of 380 nm to 780 nm, and the average value was calculated, and also the light transmittance at 550 nm was measured.

TABLE 2

| | | CTE (ppm/° C.) | | Glass transition | Adhesion | Light transmittance (%) | |
| | | Elevating temperature | Reducing temperature | temperature (° C.) | force (N/cm) | Average value | 550 nm |
|---|---|---|---|---|---|---|---|
| Example | 1 | 4.5 | 4.7 | 410 | 0.54 | 60.3 | 62.9 |
| | 2 | 9.2 | 8.3 | 396 | 0.35 | 56.2 | 57 |
| | 3 | 15.0 | 13.4 | 379 | 0.2 | 54.3 | 55.8 |
| | 4 | 14.3 | 11.3 | 381 | 0.2 | 52 | 54.2 |
| | 5 | 14.2 | 12.2 | 380 | 0.1 | 49.7 | 51.3 |
| Comparative | 1 | 18.9 | 17 | 357 | 0.05 | 61.4 | 64.2 |
| Example | 2 | 25 | 30 | 338 | 0.01 | 48.5 | 54 |

The invention claimed is:

1. A polyimide comprising a polymer in which a diamine monomer and a dianhydride monomer are polymerized, wherein the average light transmittance in a wavelength region of 380 nm to 780 nm is in a range of 49 to 61%, and the light transmittance at a wavelength of 550 nm is in a range of 40 to 64%,
    wherein the light transmittance was measured for the polyimide in the form of a film having an average thickness of about 15 to 17 μm,
    wherein the polymer comprises first chains and second chains shorter than the first chains, and the second chains are in an oxidized state, and
    wherein the polyimide is formed by heat-treatment in an imidization atmosphere comprising nitrogen and oxygen, the heat treatment starting at 110° C. and increasing to 460° C.;
    wherein the nitrogen and oxygen have a volume ratio of 80 to 90 and 10 respectively; and
    wherein the polyimide exhibits an adhesion force, according to ASTM D 3359, while attached to a glass substrate having a width of 10 mm and peeling at a rate of 20 mm/min and a peel angle of 180°, of 0.3 N/cm or more.

2. The polyimide according to claim 1, wherein the oxidized second chains are included in a range of 5 wt % or less in the total polymer.

3. The polyimide according to claim 1, wherein the diamine monomer comprises 3,5-diamino benzoic acid, 3,3-dihydroxy-4,4-diamino-biphenyl, 2,5-dihydroxy-p-phenylenediamine, 4,6-diaminoresorcinol, 1,4-diaminobenzene (PPD), 1,3-diaminobenzene (MPD), 2,4-diaminotoluene, 2,6-diaminotoluene or 4,4'-methylenediamine (MDA).

4. The polyimide according to claim 1, wherein the dianhydride monomer comprises pyromellitic dianhydride (PMDA), 3,3',4,4'-biphenyltetracarboxylic dianhydride (s-BPDA) or 2,3,3',4'-biphenyltetracarboxylic dianhydride (a-BPDA).

5. The polyimide according to claim 1, wherein the diamine monomer comprises at least one or more hydroxyl groups in the molecular structure.

6. The polyimide according to claim 1, wherein the thermal decomposition temperature is 560° C. or more.

7. The polyimide according to claim 1, wherein the glass transition temperature is 360° C. or more.

8. The polyimide according to claim 1, wherein the coefficient of thermal expansion (CTE) is 15 ppm/° C. or less.

9. A method for manufacturing the polyimide according to claim 1, comprising imidizing a polyimide precursor composition by heat treatment under a nitrogen and oxygen atmosphere, the heat treatment starting from 110° C. and increasing to 460° C.;
    wherein the nitrogen and oxygen have a volume ratio of 80 to 90 and 10 to 20 respectively.

10. The method for manufacturing a polyimide according to claim 9, wherein the polyimide having the form of a film with a thickness of 5 to 50 μm is manufactured.

11. The method for manufacturing a polyimide according to claim 9, wherein the polyimide precursor composition has solid contents in a range of 5 to 30 wt %.

12. The method for manufacturing a polyimide according to claim 9, wherein the polyimide precursor composition has a viscosity of 10,000 cP or less as measured by a Brookfield viscometer in the RV-7 spindle under conditions of a temperature of 23° C. and a rotation speed of 0.5 rpm.

* * * * *